United States Patent [19]
Hoefs

[11] 3,972,384
[45] Aug. 3, 1976

[54] SPARK ARRESTING MUFFLER

[75] Inventor: Wallace E. Hoefs, Imperial Beach, Calif.

[73] Assignee: Ralph Electric Plants, Inc., Chula Vista, Calif.

[22] Filed: Apr. 17, 1975

[21] Appl. No.: 568,843

[52] U.S. Cl. .............................. 181/36 C; 55/276; 55/DIG. 20; 55/DIG. 30; 181/50; 181/53; 181/57
[51] Int. Cl.² .......................................... F01N 3/06
[58] Field of Search ............ 181/35 R, 35 B, 36 R, 181/36 C, 49, 50, 53, 57, 71, 69, 40; 55/276, DIG. 20, DIG. 30

[56] References Cited
UNITED STATES PATENTS

| | | | |
|---|---|---|---|
| 1,972,065 | 8/1934 | Noblitt | 181/69 X |
| 3,117,650 | 1/1964 | Ludlow et al. | 181/71 X |
| 3,556,735 | 1/1971 | Epelman | 181/69 X |
| 3,685,613 | 8/1972 | Snodgrass et al. | 181/40 X |

FOREIGN PATENTS OR APPLICATIONS

| | | | |
|---|---|---|---|
| 9,414 | 3/1914 | United Kingdom | 181/71 |
| 25,470 | 10/1914 | United Kingdom | 181/57 |

*Primary Examiner*—John Gonzales
*Attorney, Agent, or Firm*—Brown & Martin

[57] ABSTRACT

A muffling device for use on the exhaust of an electric generator engine includes an arrestig chamber, partitioned into two compartments by means of an apertured partition. The first compartment is packed with stainless steel wool to filter out hot particulates from the exhaust of the generator engine. The filtered exhaust gases pass through the apertures into the second compartment from where they are directed to the atmosphere by means of a tubular member connected in said second compartment. A muffling chamber is connected directly to the exhaust of the electric generator engine and the exhaust gases first flow into that chamber. A cross-over conduit is in fluid communication with both chambers and directs the exhaust gases from the muffling chamber into the first compartment of the arresting chamber.

9 Claims, 7 Drawing Figures

SPARK ARRESTING MUFFLER

BACKGROUND OF THE INVENTION

Camping and travel equipment have become quite sophisticated in that many conveniences once reserved for the home, are now available on recreational trips. Many of these conveniences, such as air conditioning, T.V., refrigerator, coffee pot, lights, toaster, fry pan, iron, radio and the like, are designed for operation by on-site generated electric current. Accordingly, electric generators are now provided as standard equipment for many of the new generation campers and trailers. It is not unusual for portable electric generators to be installed in other type vehicles, such as converted pick-up trucks, to power the same appliances as previously discussed.

Many of the electric generators are of the standard four cycle engine type and are fueled by gasoline or propane. As with any engine that operates from petroleum or petroleum derivatives, the exhaust is characterized by hot particulates, commonly carbon ash or sparks. In most areas of travel, it is highly desirable to prevent those hot particulates from entering the atmosphere. It is particularly crucial to prevent the particulates from being exhausted in woodlands or areas of flammable brush. In some areas, governmental regulations may require the use of a muffling device which prevents spark emission on electric generators. In recognition of the problem, the U.S. Department of Agriculture-Forest Service, provides testing of spark arresters to qualify under their standards.

Exhaust muffling and spark arrest in electric generators of the type described, present some unusual problems. In an ordinary automobile engine, there is a substantial distance between the exhaust outlet of the engine to the muffler at the rear of the car. This means that a spark or hot particulate may travel on the order of 12 to 17 feet and more before being exhausted or trapped in the muffler. During that travel, substantial cooling can take place, and the spark can burn itself out. In small electric generators, there is no such extensive travel possible because of the limited cabinet space. Therefore, the sparks must be trapped almost immediately upon being delivered by the engine into the muffler. There is no chance for the sparks to cool or burn out before being passed into the muffler or arresting device.

The prior art comprises a spark arrester characterized by a single chamber having a diagonal partition or screen. The screen is included to trap the hot particulates within the chamber to prevent their exhaust into the atmosphere. This system is not completely effective in removing all hot particulates from the exhaust. It is only necessary for a hot particulate to pass the small interface occupied by the screen to be in a position whereby it can be exhausted into the atmosphere. The particulates are often very small and are able to pass through even the finest mesh screen included in the muffling devices. Furthermore, the screen cannot be made with apertures that are too small, without greatly increasing the back pressure of the system and hindering the performance of the engine. It has been recognized that there is a need for a spark arresting device that is efficient in its filtering out of all hot particulates, and at the same time permits the generator to function at its peak efficiency.

SUMMARY OF THE INVENTION

It is an object of the invention to provide a new and improved muffler.

Another object of the invention is the provision of a new and improved muffler that arrests the exhaust of hot particulates into the atmosphere.

Another object of the invention is the provision of a new and improved muffler, that qualifies for use in fire hazard areas.

Another object of the invention is the provision of a new and improved muffler that is quiet in operation and exhibits minimum vibration.

Another object of the invention is the provision of a new and improved muffler for use with electric generators.

Another object of the invention is the provision of a new and improved muffler that is conveniently enclosed in a generator unit housing.

Another object of the invention is the provision of a new and improved muffler that is supported by the generator housing.

Another object of the invention is the provision of a new and improved muffler packed with stainless steel wool for the filtering of hot particulates from the exhaust gases.

Another object of the invention is the provision of a new and improved dual chamber spark arresting muffler.

Another object of the invention is the provision of a new and improved muffler that can be cleaned of trapped particulates.

Another object of the invention is the provision of a new and improved muffler for use with an electric generator and that supports the generator choke.

Another object of the invention is the provision of a new and improved muffler that is compact, durable and efficient in its spark arresting and sound attenuating functions.

In accordance with the above objects, the muffler comprises muffling and arresting chambers. The arresting chamber of the muffler is partitioned into two compartments, the partition comprising a divider plate that is apertured in a forward zone thereof. One of the compartments of the arresting chamber is packed with a fiberous material, such as stainless steel wool. The packing is disposed in that compartment between an apertured baffle and a removable cap. The hot exhaust gases flow through the stainless steel wool and the hot particulates are trapped in the fibers. The filtered exhaust gases flow through the apertures in the divider plate and into the other compartment of the arresting chamber. A flexible hose is welded inside the other compartment and the exhaust gases enter the flexible hose for exhaust to the atmosphere through a coupler. The coupler is connected to an external flexible hose that winds within the generator cabinet and terminates directly behind the exhaust louvers.

The chamber is capped at both ends. The cap adjacent the steel wool packing is removable to permit the extraction of accumulated particulates from the steel wool. A cross-over conduit fluidly connects the two chambers. The arresting chamber, by means of a coupler, is connected to the exhaust of the generator. A flexible hose is disposed within the muffling chamber and directs the exhaust gases into that chamber, at a point distal from the cross-over conduit. The exhaust gases counterflow through the cross-over conduit and into the arresting chamber. The dual chambers provide the flow path necessary to cool and quiet the operation of the muffler.

An angle bracket is connected to the exterior of the arresting chamber and depends therefrom and is bolted to the generator housing. Another bracket is connected across the front caps of both chambers and is adapted to support the generator choke.

The above and other objects of the instant invention will be apparent as the description continues and when read in conjunction with the appended drawings.

DETAILED DESCRIPTION

Figure 1:
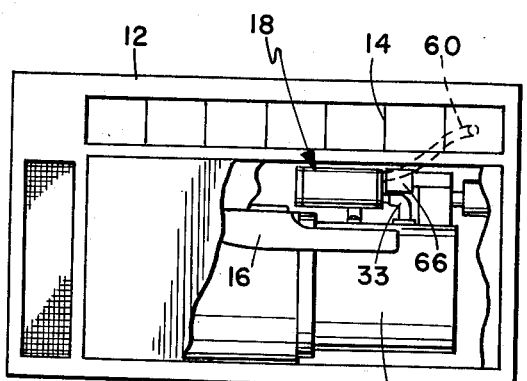
FIG. 1 is a side elevational view, partially cut away, of a generator unit with a muffler installed.
Figure 3:
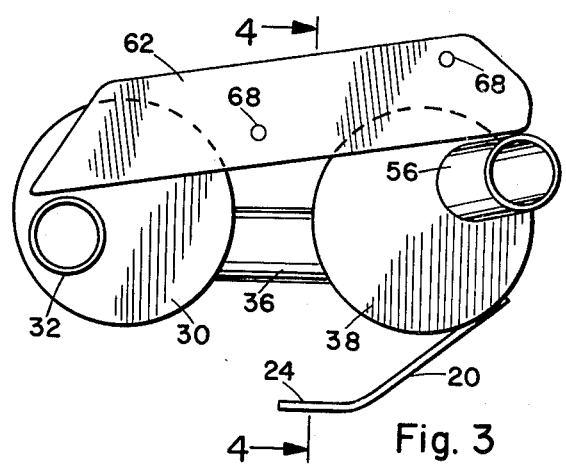
FIG. 3 is an end elevation view of the muffler.
Figure 2:
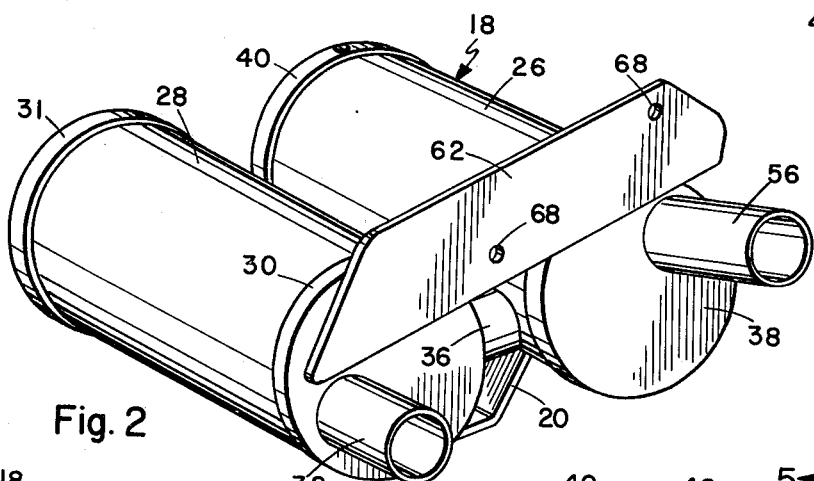
FIG. 2 is a perspective view of the muffler.
Figure 4:
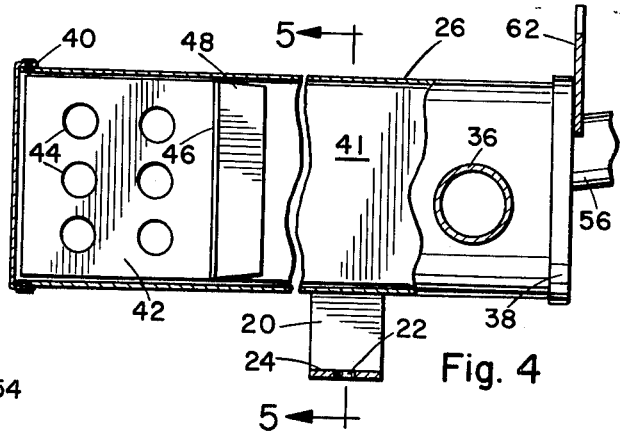
FIG. 4 is a sectional view taken along the line 4—4 of FIG. 3 with additional portions cut away.
Figure 6:
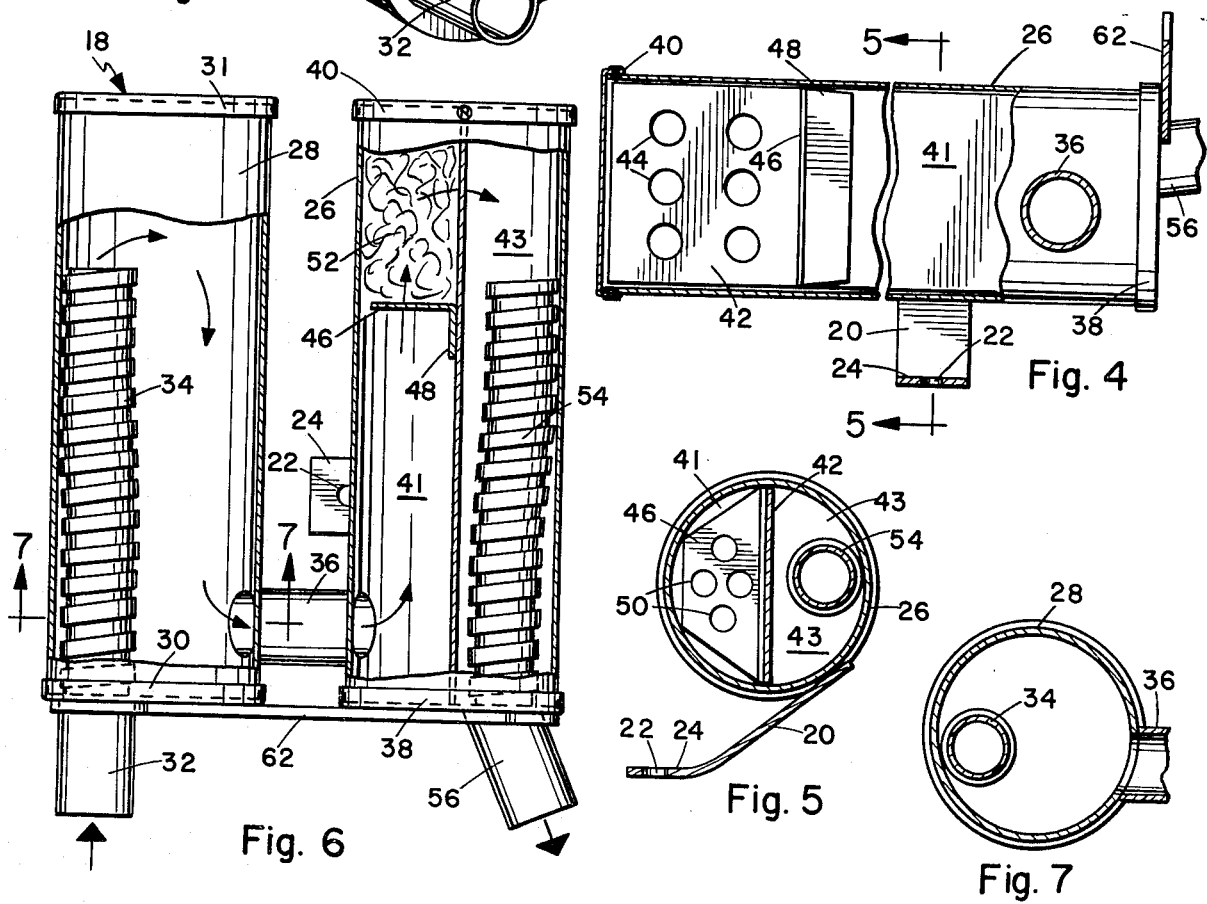
FIG. 6 is a top plan view of the muffler with portions cut away.
Figure 5:
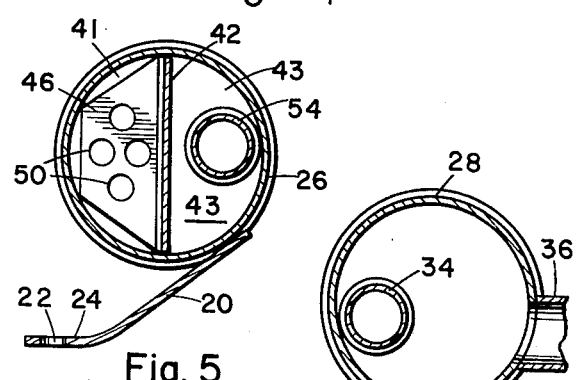
FIG. 5 is a sectional view taken along the line 5—5 of FIG. 4.
Figure 7:
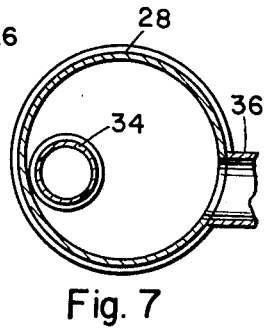
FIG. 7 is a sectional view taken along the line 7—7 of FIG. 6.

Generating equipment used with campers, van campers, motor homes, mini-homes, travel trailers and the like, are utilized to power a variety of electrical appliances. A typical generator 10, such as a 7hp, four cycle, engine producing 110 volts at 60 cycles, is conveniently housed in a cabinet 12, behind a series of louvers 14. A duct 16 divides the cabinet 12 into a lower generator section and an upper section in which the muffler 18 is supported. The muffler 18 is supported by means of an angle bracket 20 having an opening 22 in its front part 24. The muffler 18 is bolted to the generator 10 housing through the opening 22.

The muffler 18 has muffling and arresting hollow, tubular chambers 26, 28. Chamber 28 is closed at both ends by means of caps 30, 31. A coupler 32 directs the exhaust gases into chamber 28 through a flexible hose 34 that may be welded to the interior of chamber 28. Coupler 32, via elbow 33 is connected to the exhaust of generator 10. The flexible hose 34 terminates in the vicinity of cap 31 and the exhaust gases are turned and counterflow toward cap 30. A cross-over conduit 36 is fluidly connected to both chambers 26 and 28, and it directs the exhaust gases into chamber 28. Chamber 26 is closed at one end by means of a cap 38, and at its other end by means of a removable cap 40. Chamber 26 is partitioned into compartments 41 and 43. The partitioning is accomplished by means of a plate 42 that is apertured 44 in a zone adjacent the removable cap 40. A baffle plate 46 includes a series of apertures 50 and a brace 48 for connection to the plate 42. A fibrous material 52, such as stainless steel wool, type 430, is packed into compartment 41 between the baffle plate 46 and the removable cap 40. The stainless steel 52 filters hot particulates from the exhaust gases and prevents them from being exhausted into the atmosphere. It has been found that the use of stainless steel wool prolongs the useful life and efficiency of the muffler 18. The now filtered exhaust gases pass through the apertures 44 and enter into compartment 43. Thereafter, the gases flow into the flexible hose 54 that is welded to the interior of chamber 26, and then out through the coupler 56.

The coupler 56 is connected to the flexible hose 60 that winds within cabinet 12 and terminates behind the louvers 14. It is through those louvers 14 that the gases are exhausted in a filtered and cooled condition to the atmosphere.

A bracket 62 is welded along its rear face to the caps 30, 38. The engine choke 66, which may be an automatic electric choke, is supported on the front face of bracket 62 by means of the holes 68.

The muffler 18 is supported in a generally vibration free environment and the exhaust gases are cooled and filtered prior to exhausting to the atmosphere. The muffler is sufficiently effective so that it qualifies for use in heavily wooded fire hazardous areas.

Modifications and adaptions, in the method and materials of fabrication, in the configuration and assemblage of the constituent elements, may be made without departing from the spirit and scope of the appended claims, which changes are intended to be embraced therewithin.

Having described my invention, I now claim:

1. For use on an exhaust outlet of a device producing hot exhaust gases, a muffling device for the suppression of hot particulates from exhausting to the atmosphere comprising:
   an arresting chamber,
   a partition dividing said arresting chamber into at least two compartments, said partition extending longitudinally in said arresting chamber to substantially extend the course of the exhaust gases within the arresting chamber by forcing the gases to traverse the length of one compartment and then the other compartment, thereby cooling the gases before exhausting to the atmosphere,
   said partition is apertured in a region distal from the point of entry of exhaust gases into said chamber,
   a multiplicity of closely spaced fibers in said chamber on one side of said partition, packed adjacent said apertures for filtering the exhaust gases to remove particulates therefrom,
   and the filtered exhaust gases first passing through said one compartment, then through said fibers, through said apertures and through said other compartment prior to being directed to the atmosphere from said other compartment.

2. The muffling device of claim 1, wherein:
   said closely spaced fibers comprise a stainless steel wool matrix.

3. The muffling device of claim 1, further comprising:
   a tubular member in said arresting chamber for directing the filtered exhaust gases to the atmosphere;
   and said tubular member extending into said other compartment and terminating adjacent the region of apertures in said partition.

4. The muffling device of claim 3, wherein:
   said tubular member is welded to an interior wall of said other compartment.

5. The muffling device of claim 1, further comprising:
   a cap removably connected to said arresting chamber, said cap being removable for the cleaning of accumulated particulates from the interior of said chamber.

6. The muffling device of claim 1, further comprising:
   a muffling chamber;

and a connecting conduit for accepting exhaust gases passed from said muffling chamber and delivering the same into said arresting chamber.

7. The muffling device of claim 6, further comprising: a tubular member in said muffling chamber for directing exhaust gases into said muffling chamber.

8. The muffling device of claim 6, further comprising: closures on said muffling and arresting chambers; and a mounting bracket connected across said closures.

9. The muffling device of claim 6, further comprising: a support mounting bracket connected to one of said chambers for attachment to supporting structure.

* * * * *